United States Patent [19]

Sakaguchi et al.

[11] Patent Number: 4,988,204

[45] Date of Patent: Jan. 29, 1991

[54] JOINT INSPECTION APPARATUS

[75] Inventors: Masaaki Sakaguchi; Kazuo Kubota; Fusao Ichikawa, all of Kanagawa, Japan

[73] Assignee: Fuji Photo Film Co., Ltd., Kanagawa, Japan

[21] Appl. No.: 211,644

[22] Filed: Jun. 27, 1988

[30] Foreign Application Priority Data

Jul. 2, 1987 [JP] Japan .................. 62-166028

[51] Int. Cl.⁵ ........................... G01N 21/89
[52] U.S. Cl. ..................... 356/430; 250/572; 356/237
[58] Field of Search .......... 356/429, 430, 237; 250/561, 562, 572

[56] References Cited

U.S. PATENT DOCUMENTS 3,718,823  2/1973  Niikura et al. .............. 250/561
3,833,816  9/1974  Emura et al. ............... 250/561
4,680,806  7/1987  Bolza-Schunemann ....... 250/561

Primary Examiner—Richard A. Rosenberger
Attorney, Agent, or Firm—Sughrue, Mion, Zinn, Macpeak & Seas

[57] ABSTRACT

A joint inspection apparatus comprises a light irradiating device for irradiating light to a tape joint at which two tape edge portions are joined together, and a light receiving device for receiving the light irradiated by the light irradiating device to the tape joint and passing through the tape joint or reflected by the tape joint. A judgment device is provided for judging the extent of a deviation of the two tape edge portions from each other in the tape width direction at the tape joint on the basis of information on the optical amount of the light received by the light receiving device on both sides of the tape joint.

6 Claims, 2 Drawing Sheets

JOINT INSPECTION APPARATUS

BACKGROUND OF THE INVENTION

1. Field of the Invention

This invention relates to a joint inspection apparatus for automatically inspecting a deviation of tape edge portions from each other in the tape width direction at a tape joint in the case where long tapes are joined together. This invention particularly relates to a joint inspection apparatus for detecting a deviation of edge portions of, for example, a leader tape and a magnetic tape from each other in the tape width direction, which deviation may arise in the case where the leader tape and the magnetic tape are joined together at the edge portions thereof by use of a joining tape for obtaining a video tape, an audio tape, or the like.

2. Description of the Prior Art

In the course of making video tape cassettes or audio tape cassettes, a leader tape (or a trailer tape) and a magnetic tape are joined together by use of a joining tape, and a deviation of the edge portions of the leader tape and the magnetic tape from each other in the tape width direction at the joint area heretofore has been judged by visual inspection by the operators.

However, with the visual inspection, criteria of judgment differ among the operators, and defective products may be missed due to fatigue of the operators. Therefore, it is not always possible to make the quality of the products uniform. Also, personnel expenses for the operators cause the product cost to increase, and the production speed is decreased by the presence of the artificial process in the production processes.

SUMMARY OF THE INVENTION

The primary object of the present invention is to provide a joint inspection apparatus for automatically detecting a deviation of tape edge portions from each other in the tape width direction at a tape joint, thereby to make the quality of tape products uniform.

Another object of the present invention is to provide a joint inspection apparatus which enables reduction in the tape product cost and an increase in the tape production speed.

The present invention provides a joint inspection apparatus comprising:

(i) a light irradiating means for irradiating light to a tape joint at which two tape edge portions are joined together, (ii) a light receiving means for receiving the light irradiated by said light irradiating means to said tape joint and passing through said tape joint or reflected by said tape joint, and (iii) a judgment means for judging the extent of a deviation of said two tape edge portions from each other in the tape width direction at said tape joint on the basis of information on the optical amount of the light received by said light receiving means on both sides of said tape joint.

The term "tape joint" as used herein means the joint area formed when two tape edge portions are joined together such that the edge faces of the two tape edge portions stand facing each other or the two tape edge portions overlap one upon the other.

The light receiving means may be of the type capable of receiving the light irradiated to areas in the vicinity of side edges of the two tapes near the tape joint, and judging whether the light impinged upon the tapes on the basis of the received optical amount. The light receiving means may be composed of, for example, a plurality of phototransistors, a line sensor, or a surface sensor. In the case where the light receiving means is composed of a line sensor extending in the tape width direction, it is necessary to move the tape joint with respect to the light irradiating means and the light receiving means in the tape length direction for sequentially obtaining the information on the optical amounts on both sides of the tape joint. On the other hand, in the case where the light receiving means is composed of a surface sensor such as a charge coupled device (CCD) or the like, the tape joint may be maintained stationary with respect to the light irradiating means and the light receiving means. In this case, it is necessary to cause the light obtained on both sides of the tape joint to impinge upon the surface sensor simultaneously or substantially simultaneously, and then sequentially obtain the information on the optical amount over the overall surface of the surface sensor by electronic scanning.

The judgment means judges the extent of a deviation of two tape edge portions from each other in the tape width direction at the tape joint on the basis of information on the optical amount, for example, by comparing a difference between the information on the optical amount on one side of the tape joint and the information on the optical amount on the other side of the tape joint with a predetermined reference value.

With the joint inspection apparatus in accordance with the present invention, a deviation of the tape edge portions from each other in the tape width direction at the tape joint is determined automatically on the basis of the information on the optical amount on both sides of the tape joint obtained by receiving the light irradiated to the tape joint and passing through the tape joint or reflected by the tape joint. Therefore, the quality of the tape products can be judged objectively and reliably by comparing the extent of the deviation with the predetermined reference value, and the quality of the products can be made uniform. Also, with the determination by the automatic detection, the deviation of the tape edge portions from each other in the tape width direction at the tape joint can be judged instantaneously by the light detection and processing of the electric signals, and the production speed can be increased since the inspection efficiency is not caused to decrease by fatigue of the operators as in the case of visual inspection. Moreover, with the joint inspection apparatus in accordance with the present invention which has a simple configuration and which can be fabricated at a low cost, the tape production cost can be decreased as compared with the case where personnel expenses are required for the operators engaging in visual inspection.

DESCRIPTION OF THE PREFERRED EMBODIMENTS

The present invention will be described hereinbelow in further detail with reference to the accompanying drawings.

Figure 1:
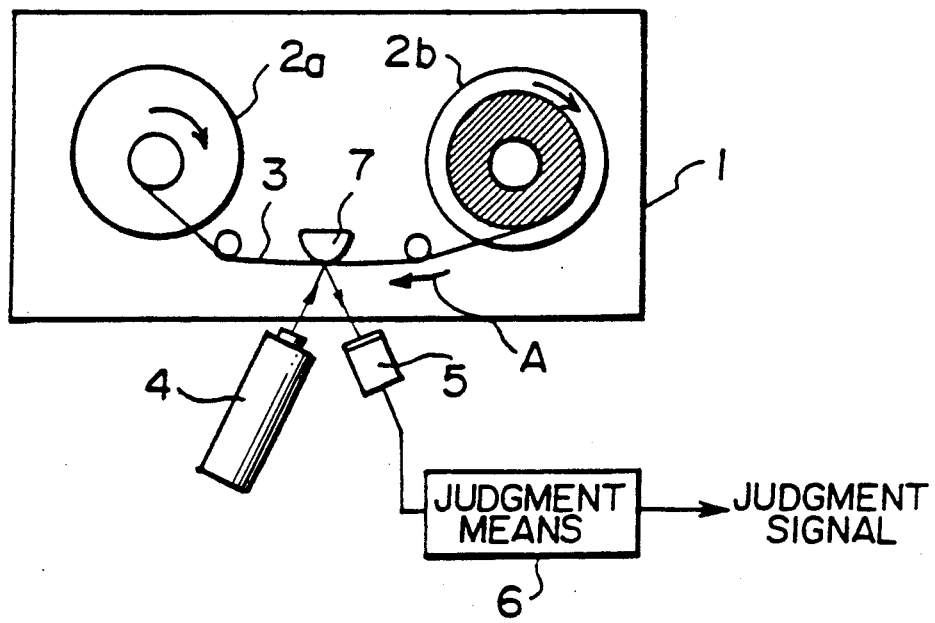
FIG. 1 is a schematic view showing an embodiment of the joint inspection apparatus in accordance with the present invention.

With reference to FIG. 1, an embodiment of the joint inspection apparatus in accordance with the present invention comprises a light irradiating means 4 for irradiating a collimated light beam to a tape 3 moved in the direction as indicated by the arrow A between reels 2a and 2b provided on a pallet 1, a light receiving means 5 for receiving the light beam irradiated by the light irradiating means 4 to the tape 3 and reflected by the tape 3, and a judgment means 6 for inspecting a deviation of edge portions of a leader tape and a magnetic tape from each other in the tape width direction at the tape joint on the basis of information on the optical amount of the light beam received by the light receiving means 5, and generating a judgment signal indicating that the product is defective in the case where the extent of the deviation exceeds a predetermined reference value. Also, a backup head 7 having a hollow portion at the middle of the tape sliding surface is disposed on the side opposite to the light irradiating means 4 with respect to the tape 3 in the vicinity of the position at which the light produced by the light irradiating means 4 impinges upon the tape 3.

Figure 2:
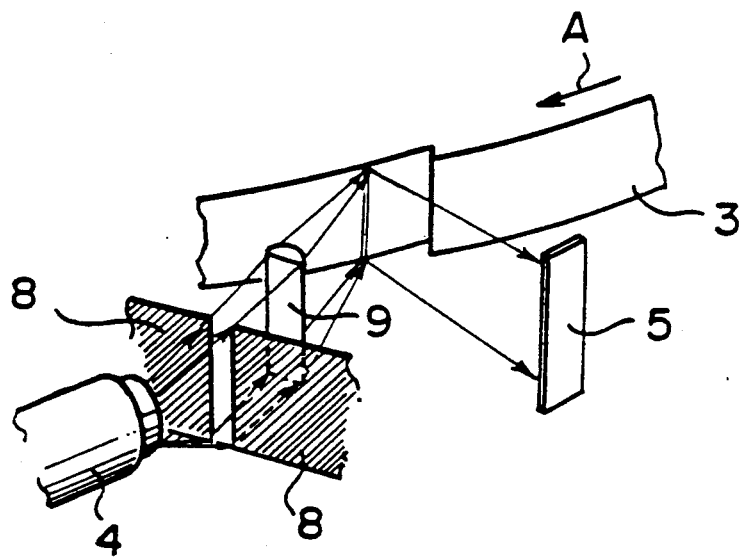
FIG. 2 is a perspective view showing in detail a part of the embodiment shown in FIG. 1.

FIG. 2 shows in detail a part of the light irradiating means 4 and a part of the light receiving means 5. Slit members 8, 8 for forming a slit extending in the tape width direction and a cylindrical lens 9 extending in the tape width direction are disposed in front of the light irradiating means 4, so that the light beam produced by the light irradiating means 4 impinges upon the tape 3 as a linear light beam extending in the tape width direction. Also, as shown in FIG. 2, the light beam reflected by the tape 3 is in the form of a linear light beam extending in the tape width direction, and is received in this form by a line sensor employed as the light receiving means 5.

A known motor capable of achieving constant speed movement of the tape 3 is employed as the tape movement mechanism. As the loading and unloading mechanism for the backup head 7, by way of example, a cylinder mechanism is employed.

Operations of judging a deviation of the tape edge portions from each other in the tape width direction at the tape joint by use of this embodiment will be described hereinbelow.

The reels 2a and 2b are rotated to move the tape 3 at a constant speed of approximately 20 mm/sec in the direction as indicated by the arrow A between the reels 2a and 2b. At the same time, the light beam is irradiated by the light irradiating means 4 onto the tape 3. The backup head 7 is disposed in advance to contact the tape 3 at the back of the tape area upon which the light beam impinges. The light receiving means 5 is provided so that its light receiving face receives the light beam reflected by the tape 3. Also, the information on the optical amount of the light beam reflected by the tape 3 and received by the light receiving means 5 is fed sequentially as digital electric signals to the judgment means 6.

The tape 3 has been formed by joining the edge portion of the leader tape and the edge portion of the magnetic tape together by use of a joining tape. The leader tape and the magnetic tape have been formed so that the widths thereof are approximately equal to each other. Therefore, in the case where the leader tape and the magnetic tape have been joined together accurately, the side edges of the leader tape and the side edges of the magnetic tape continue to each other. However, actually, it is not always possible to adjust the positions of the leader tape and the magnetic tape accurately in the course of the joining, so that the joining accuracy fluctuates and the edge portions of the leader tape and the magnetic tape may deviate from each other in the tape width direction at the tape joint. A large deviation of the tape edge portions from each other in the tape width direction deteriorates the quality of the tape product, and therefore delivery of such a tape product to the market must be avoided.

Figure 3:
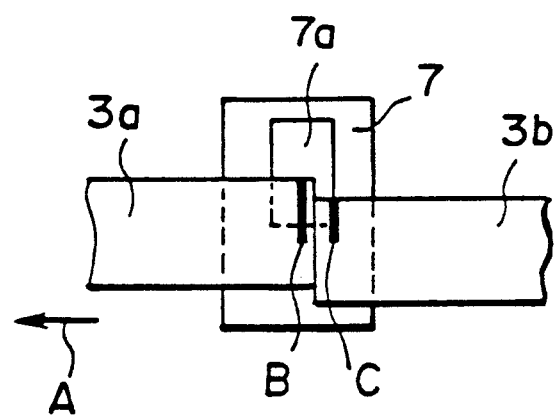
FIG. 3 is a schematic view showing irradiation of light produced by the light irradiating means to the area in the vicinity of a tape joint.
Figure 4:
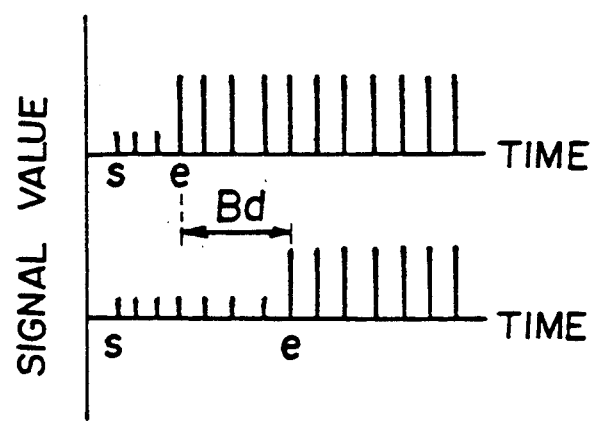
FIG. 4 is an explanatory graph showing the operation of the optical amount information converted into digital electric signals, which is carried out by the judgment means in the embodiment shown in FIG. 1.

Accordingly, the aforesaid embodiment is constituted for automatically judging whether the extent of the deviation of the tape edge portions from each other in the tape width direction is lower or higher than the predetermined reference value, and discriminating the quality of the product. Specifically, in the course of inspection of the tape 3 having a deviation of the tape edge portions from each other in the tape width direction as shown in FIG. 3, at the time the tape 3 is moved and a linear region B in the vicinity of the tape joint on a leader tape 3a arrives at the light beam irradiating position, the information on the optical amount of the light beam reflected by the linear region B is fed to the judgment means 6 via the light receiving means 5. At the time the tape 3 is moved further in the direction as indicated by the arrow A and a linear region C in the vicinity of the tape joint on a magnetic tape 3b arrives at the light beam irradiating position, the information on the optical amount of the light beam reflected by the linear region C is fed to the judgment means 6 via the light receiving means 5. A hollow portion 7a is formed at the middle of the backup head 7, and the light incident upon the hollow portion 7a passes therethrough and does not impinge upon the light receiving means 5. In this case, the light beam produced by the light irradiating means 4 is irradiated only to the upper side of the tape 3. The light impinging upon photodiodes of the light receiving means 5 is converted to digital electric signals of levels proportional to the optical amounts. The digital electric signals are fed to the judgment means 6 sequentially in the order starting with the top photodiode of the light receiving means 5. Therefore, in the case where the levels of the digital electric signals fed as the information on the light amount to the judgment means 6 are plotted on the vertical axis and the time is plotted on the horizontal axis, the information on the optical amount obtained from the region B is expressed as shown on the upper side of FIG. 4, and the information on the optical amount obtained from the region C is expressed as shown on the lower side of FIG. 4. The judgment means 6 calculates the time "t" between a signal start point "s" and a point "e" at which the signal level increases sharply. The calculation is carried out for each region by use of a microcomputer. The judgment means 6 also calculates a difference Bd between the time "t" for the region B and the time "t" for the region C, and compares the difference Bd with the predetermined reference value. The judgment means 6 generates an OK signal as the judgment signal when the difference Bd is smaller than the predetermined reference value, and generates a NG signal as the judgment signal when the difference Bd is larger than the predetermined reference value. The reference value is determined by considering an error of the squareness of the optical axis with respect to the tape 3, the inclination of the workpiece or the like, and is stored in advance in the judgment means 6. Actually, the information on the optical amount is detected at predetermined sampling intervals. Therefore, in order to improve the reliability of the judgment results, the time "t" may be calculated for a plurality of the regions on the leader tape and the magnetic tape and averaged for each of the leader tape and the magnetic tape, and then the difference Bd may be calculated in the manner as mentioned above.

The judgment signal may be fed to a buzzer so that a warning is issued for a predetermined period in the case where the NG signal is generated. Also, light emitting diodes may be provided on a control panel for visibly indicating the OK signal and the NG signal generated as the judgment signal. This method is advantageous for sorting of the products.

In the aforesaid embodiment, the tape 3 before being housed in a cassette is inspected. However, after the tape 3 also has been housed in a cassette, inspection can be carried out in the same manner by opening and closing a guard panel.

Also, in the aforesaid embodiment, the information on the optical amount is obtained by receiving the light beam reflected by the tape 3. However, the joint inspection apparatus in accordance with the present invention may be constituted to obtain the information on the optical amount by receiving a light beam passing through the tape 3.

In the aforesaid embodiment, the information on the optical amount of the light beam obtained at respective regions on the tape 3 is obtained by securing the light irradiating means 4 and the light receiving means 5 and moving the tape 3. Instead, the information on the optical amount of the light beam obtained at respective regions on the tape 3 may be obtained by moving the light irradiating means 4 and the light receiving means 5 in the tape length direction. Alternatively, the light receiving means 5 may be constituted by a surface sensor such as a CCD, and the light irradiating means 4, the light receiving means 5, and the tape joint may be disposed at such positions that the light beam irradiated onto the area in the vicinity of the tape joint and reflected by said area or passing through said area simultaneously impinges upon the surface sensor. Then, the quality of the tape product may be judged in the same manner as in the aforesaid embodiment on the basis of the information on the optical amount generated by the surface sensor.

I claim:

1. A joint inspection apparatus comprising:
 (i) a light irradiating means for irradiating light to a tape joint at which two tape edge portions are joined together,
 (ii) a light receiving means for receiving the light irradiated by said light irradiating means to said tape joint and passing through said tape joint or reflected by said tape joint, and
 (iii) a judgment means for judging the extent of a deviation of said two tape edge portions from each other in the tape width direction at said tape joint on the basis of information on the optical amount of the light received by said light receiving means on both sides of said tape joint.

2. An apparatus as defined in claim 1 wherein slit members for forming a slit extending in the tape width direction and a cylindrical lens extending in the tape width direction is provided between said light irradiating means and the tape.

3. An apparatus as defined in claim 1 wherein said judgment means is connected to a warning means for issuing a warning at the time the deviation is detected.

4. An apparatus as defined in claim 1, wherein said judging means compares said deviation with a predetermined reference value.

5. An apparatus as defined in claim 4, wherein said warning means comprises a buzzer.

6. An apparatus as claimed in claim 4, wherein said warning means comprises a light emitting diode.

* * * * *